Sept. 4, 1956

S. Q. DUNTLEY 2,761,320

SEA STATE METER

Filed April 7, 1952

INVENTOR
SEIBERT Q. DUNTLEY

BY
ATTORNEYS

Sept. 4, 1956      S. Q. DUNTLEY      2,761,320
SEA STATE METER

Filed April 7, 1952      2 Sheets-Sheet 2

INVENTOR
SEIBERT Q. DUNTLEY

BY D. C. Snyder
Joseph Weingarten
ATTORNEYS

United States Patent Office 2,761,320
Patented Sept. 4, 1956

2,761,320

SEA STATE METER

Seibert Q. Duntley, West Newton, Mass., assignor, by mesne assignments, to the United States of America as represented by the Secretary of the Navy Application April 7, 1952, Serial No. 280,988

7 Claims. (Cl. 73—432)

This invention relates generally to liquid level indicators and more particularly to apparatus for measuring and recording the surface conditions of a liquid.

In the study of objects submerged in water, the problem is complicated by the refractive and reflective properties of the water. When the surface of the water is perfectly calm, known optical principles can be used to predict the apparent contrast seen by the observer, but when the water surface is roughened by the wind, additional information is required and new optical principles must be applied to arrive at a solution. It has been observed that the amplitude of the waves on a roughened water surface does not seriously affect the optical properties of the water; it is the slope of the water surface which determines its refractive and reflective effects. Moreover, the slope of the waves on the water surface roughened by the wind varies with wind direction, that is, the slope of the waves "with the wind" is somewhat different than the slope of the waves "across the wind." Accordingly, the direction from which the submerged object is viewed also affects the optical problem. It is desirable, therefore, to obtain information concerning the surface conditions of the liquid as an aid toward predicting the apparent contrast seen by the observer when studying objects submerged beneath a roughened water surface.

Accordingly, an object of the present invention is to measure the slope of the waves on a roughened liquid surface.

A further object of the invention is to measure the slope of the waves in a direction with the wind and across the wind.

A still further object of the invention is to measure and record the slope and amplitude of waves on a roughened liquid surface.

According to the present invention, wave slope is measured by measuring the difference in water height between two spaced apart points in the water, this difference in height being an indication of the slope of the liquid surface between the two points. In carrying out the invention, two closely adjacent electrodes are inserted into the water at each of said points and the electrodes energized by an alternating current signal. The resistance of the water between each of the pairs of electrodes being dependent upon the water height in accordance with a hyperbolic function, each pair of electrodes produces a signal indicative of liquid height, and when these signals are compared, provide a single signal proportional to the slope of the wave. The latter signal is plotted on a suitable recorder to give a continuous record of the slope of the waves over a selected period of time. The amplitude of the waves whose slope is measured as aforesaid is determined by a single pair of similarly energized electrodes positioned between the slope measuring electrodes. The details of construction and operation of a preferred embodiment of the invention together with further objects and advantages of the invention will be readily appreciated as the same becomes better understood by reference to the following detailed description when considered in connection with the accompanying drawings wherein:

Figure 1:
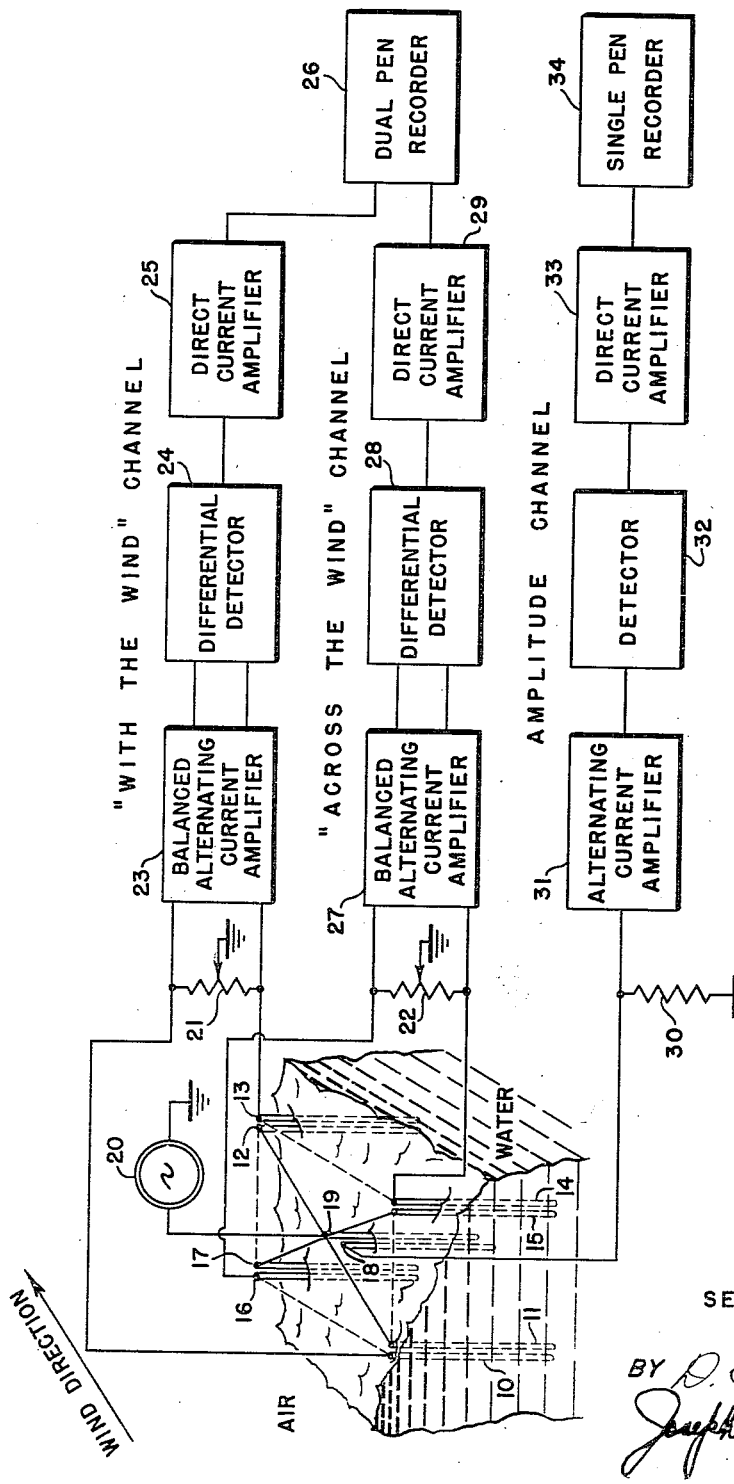
Fig. 1 is a circuit diagram of the invention partially in schematic and partially in block diagram form.

Referring to the drawing, and more particularly to Fig. 1, there is illustrated partially in schematic form, and partially in block diagram form, a preferred embodiment of the apparatus for carrying out the foregoing objects of the invention. The measuring equipment includes five pairs of suitably spaced electrodes arranged to be raised or lowered as a unit into a liquid the surface of which it is desired to investigate. The electrodes are constructed of small diameter, corrosion-resistant wire, stainless steel wire having a diameter of .018 inch having been found suitable. The electrodes are all of the same length, about four feet long is suitable, and are maintained in tension on a suitable mounting frame. The frame may include upper and lower spacer blocks to which the upper and lower ends of the wires are respectively secured, and means for adjusting the spacing between the blocks to maintain the several electrodes taut and parallel. It has been found that substantially all of the possible variations in the condition of the liquid surface can be measured with a spacing between the electrodes of each pair of about 0.2 inch and a spacing between pairs of about one inch. The details of the mounting frame have been omitted from the drawing to avoid confusion, it being understood that any suitable means for maintaining the electrodes properly spaced may be used. Four of the five pairs of electrodes are located generally at the corners of a square and the fifth pair is located at the center of the square. Electrode pairs 10, 11 and 12, 13 located at one pair of opposite corners of the square cooperate to measure the slope of the waves in one direction, while electrode pairs 14, 15 and 16, 17 cooperate to measure the slope of the surface in a direction perpendicular to said one direction. In operation, the array of electrodes is inserted into the water a distance equal to about one-half their length, and positioned with the diagonal of the square joining electrodes 10, 11 and 12, 13 disposed parallel to the wind direction thereby to measure wave slope "with the wind." With this orientation, electrodes 14, 15 and 16, 17 necessarily measure wave slope "across the wind." The fifth pair of electrodes 18, 19 is positioned centrally of the square and operates to produce a signal proportional to the amplitude of the wave whose slope is being measured.

The five pairs of electrodes are energized from a single source of power, shown by way of example, as alternator 20 having one terminal thereof connected to a point of ground potential, and the other terminal connected to one electrode of each of the five pairs. The resistance of the water to the alternating signal between the electrodes of each pair depends on the height of the liquid surrounding them, each pair thereby providing a signal indicative of liquid height. Comparison of the resistance between the electrode pairs at opposite corners of the square provides a measure of the slope of the surface of the liquid in the region between the electrodes. A circuit for measuring and recording these signals will now be described.

The unenergized electrodes 10 and 13 of the "with the wind" pairs are connected to the opposite ends of resistor 21 and the unenergized electrodes 14 and 16 of the "across the wind" pairs are connected to the opposite ends of resistor 22, each of the resistors having a center tap connected to ground. An alternating voltage inversely proportional to the resistance between electrodes 10 and 11 is developed across the upper half of resistor 21 and a voltage inversely proportional to the resistance between electrodes 12 and 13 is developed across the lower half. Similarly, a voltage inversely proportional to the resistance between electrodes 16 and 17 is developed across the upper half of resistor 22, and a voltage inversely proportional to the resistance between electrodes 14 and 15 is developed across the lower half. The center taps of resistors 21 and 22 may be adjusted to provide equal signals across the upper and lower halves of these resistors when the liquid surface is exactly level.

The signals developed across the two portions of resistor 21 are coupled to balanced alternating current amplifier 23 where the two signals are equally amplified and thereafter applied to differential detector 24. Detector 24 is arranged to detect and subtract the two signals from amplifier 23 to produce a single direct current signal having a polarity dependent upon which of the alternating current signals has the greatest amplitude and having a magnitude proportional to the difference in amplitude of the two signals. The circuit details of amplifier 23 and detector 24 will be more completely described hereinafter in connection with Fig. 2. The direct current output of detector 24 is coupled to a suitable direct current amplifier 25, which may comprise one or more stages of amplification, and is thereafter coupled to suitable recording apparatus 26.

The "across the wind" channel for detecting and subtracting the signals appearing across the two halves of resistor 22 is identical to the channel just described and comprises balanced alternating current amplifier 27, differential detector 28 and direct current amplifier 29, the output of amplifier 21 also being coupled to recorder 26.

Recorder 26 may be a dual pen recorder having a time controlled movable chart and wherein the movement of each pen is in response to a direct current signal, thereby being adapted to continuously plot a graph of slope versus time, or instead, a direct writing oscillograph may be used. The features of the recorder do not form a part of the present invention, and accordingly, any suitable recorder, so long as it is capable of recording the amplitude of two direct current signals as a function of time, may be used.

The channel for measuring the amplitude of the waves in the region of a slope measurement operates similarly to the slope measuring channels except that signal subtraction is unnecessary. The height of the liquid surrounding electrodes 18 and 19 determines the resistance therebetween and develops an alternating voltage indicative of the liquid height across resistor 30. This signal is amplified in a suitable alternating current amplifier 31 and after amplification is detected by detector 32, which may be a conventional diode detector, to produce a direct current signal having an amplitude which is directly proportional to the height of the liquid surrounding electrodes 18 and 19. The output of detector 32 is amplified in direct current amplifier 33, and thereafter is applied to a suitable recorder 34, which may be a single pen recorder, or a direct writing oscillograph, having the general characteristics as recorder 26. Recorder 34 is preferably operated synchronously with recorder 26 to record wave amplitude simultaneously with the recording of wave slope on recorder 26.

Figure 2:
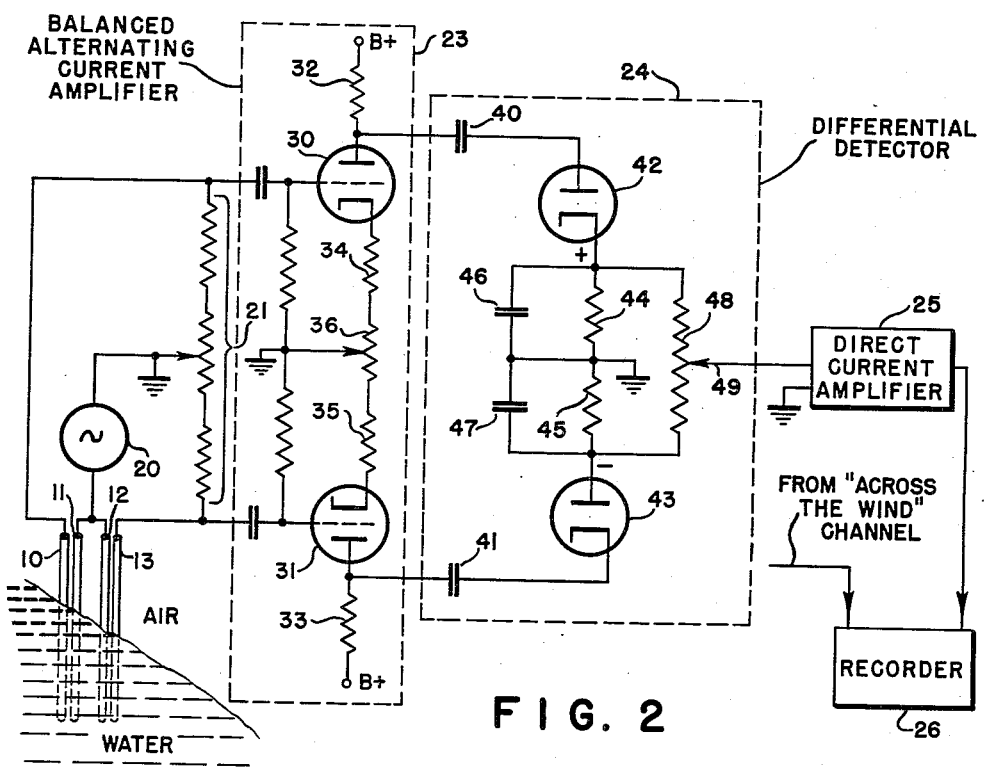
Fig. 2 is a detailed circuit diagram of a portion of the slope measuring apparatus of the invention.

Referring now to Fig. 2, the circuit details of the slope measuring channels of the system illustrated in Fig. 1 will be described in more detail. This figure illustrates the complete "with the wind" channel including the electrodes, it being understood that the "across the wind" channel is identical in all respects. As was pointed out in connection with Fig. 1, the "with the wind" channel includes electrodes 10, 11 and 12, 13 disposed along a line parallel to the wind direction. Both pairs of electrodes are energized from alternating source 20, and respectively develop voltages across the two sections of resistor 21 which are directly proportional to the water height surrounding them. To obtain suitable sensitivity, the resistance of resistors 21 and 22 is preferably small in comparision with the resistance between electrodes. It has been observed that with the spacings between electrodes mentioned above, the resistance between electrodes when inserted in fresh water to a depth of approximately two feet is of the order of 10,000 ohms, and varies about this value as the liquid level changes. Under these conditions, a resistance of 100 ohms for each half of resistors 21 and 22 has been found to be suitable. If the instrument is used to observe surface conditions of salt water, with the same electrode spacing, the value of each half of resistors 21 and 22 should be of the order of one ohm to achieve comparable sensitivity. The signals developed across the two sections of resistor 21 are coupled to balanced alternating current amplifier 23 which includes a pair of electron tubes 30 and 31 having their anodes respectively coupled to a source of energizing potential through suitable load resistors 32 and 33. The cathodes of tubes 30 and 31 are respectively coupled through cathode resistors 34 and 35 to ground through the movable contact of balancing potentiometer 36. The upper and lower terminals of resistor 21 are respectively connected to the control grids of tubes 30 and 31 through suitable coupling networks. Amplifiers 30 and 31 preferably have identical components and are balanced to provide equal amplification to input signals. Potentiometer 36 is adjustable so as to correct for any unbalance which may exist between the gains of the two amplifiers.

The anodes of tubes 30 and 31 are respectively connected through coupling condensers 40 and 41 to differential detector 24 which operates to produce a direct current signal having a sense depending upon which of the output signals from amplifier 23 has the greatest amplitude and a magnitude proportional to the differential in amplitude of these signals. Detector 24 includes a pair of electric discharge rectifier devices 42 and 43, which preferably take the form of conventional diodes, the anode of amplifier tube 30 being connected to the anode of diode 42 and the anode of amplifier tube 31 being connected to the cathode of diode 43. Load resistors 44 and 45 of equal value are connected between the cathode of diode 42 and ground and between the anode of diode 43 and ground, respectively. Suitable filter condensers 46 and 47 are connected in parallel with resistors 44 and 45, respectively, and potentiometer 48, having movable contact 49, is connected between the cathode of diode 42 and anode of diode 43.

Electrodes 10, 11 and 12, 13 being energized from a common source, the alternating signals appearing at the anodes of tubes 30 and 31 are in phase, and, accordingly, the signals applied to the anode of diode 42 and the cathode of diode 43 are in phase. With the diodes connected as shown and described, diode 42 conducts only on the positive half-cycles of the signal applied thereto, while diode 43 conducts only on the negative half-cycles. Thus, a direct potential of positive polarity and having a magnitude proportional to the positive peaks of the signal applied to diode 42 appears at the cathode of diode 42, and a direct potential of negative polarity and having a magnitude proportional to the negative peaks of the signal applied to diode 43 appears at the cathode of diode 43. Therefore, if the two alternating signals are of equal amplitude, the potential at the midpoint of potentiometer 48 with respect to ground will equal zero. However, if the signal applied to diode 42 has the greater amplitude, the potential at the midpoint of potentiometer 48 will be positive and of a magnitude proportional to the amount of unbalance, and conversely, if the signal applied to diode 43 has the greater amplitude, point 49 will be negative with respect to ground an amount proportional to the degree of unbalance. Therefore, the direct potential signal appearing at point 49 is indicative of the difference in magnitude of the two signals applied to the detector, and accordingly proportional to the difference in height of the liquid surrounding electrode pairs 10, 11 and 12, 13. This difference in height being a measure of the slope of the liquid surface between the two pairs of electrodes, the potential at point 49 is directly proportional to the slope of the waves being investigated. Although diode rectifying elements and half-wave rectification have been described as illustrative of a suitable differential detector, it will be understood that other rectifying devices and/or circuits employing full-wave rectification may be used without departing from the spirit of the invention.

The direct current signal appearing at point 49 is coupled to direct current amplifier 25 where it is amplified to a suitable level to operate recorder 26, the nature of which has previously been described. A similar direct current signal from the "across the wind" channel, indicative of the slope of the liquid surface between electrodes 14, 15 and 16, 17 is also applied to recorder 26. Recorder 26, in response to these direct signals, directly plots the slope of the waves in two directions as a function of time.

Figure 3:
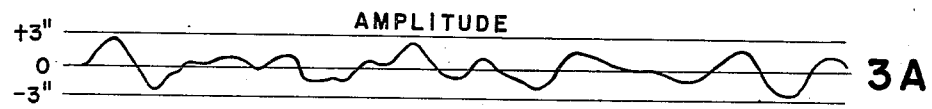
Fig. 3 is a graph showing wave amplitude and wave slope of a roughened liquid surface plotted as a function of time.
Figure 3:
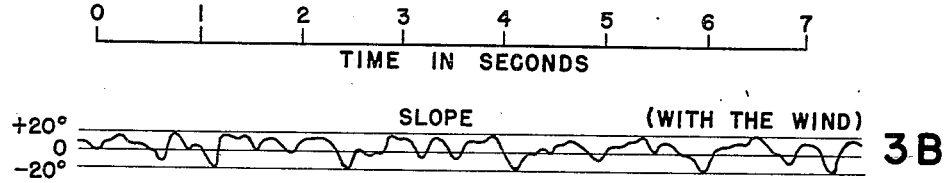
Figure 3:
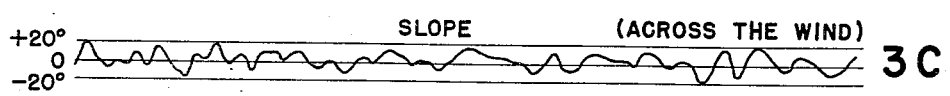

Fig. 3 is a representative plot of the amplitude and slope of the waves on a roughened water surface recorded with the apparatus of the present invention. The plot covers a period of approximately seven seconds and was made during a period when the wind velocity was five knots. Fig. 3A is a graph of the amplitude of the waves, and Fig. 3B and Fig. 3C are plots of the slope of the waves as measured "with the wind" and "across the wind," respectively, the three graphs having been recorded simultaneously. It will be apparent that the instantaneous slope of the waves as measured "with the wind" is considerably different from the instantaneous slope as measured "across the wind," and that the slope in both directions is not consistently related to wave amplitude. However, the data contained in these plots, when subsequently integrated with other data obtained by an experienced observer, is valuable in calculating the optical effects introduced by the surface conditions of the water.

Obviously many modifications and variations of the present invention are possible in the light of the above teachings. It is therefore to be understood that within the scope of the appended claims the invention may be practiced otherwise than specifically described.

What is claimed is:

1. Apparatus for measuring the slope of a liquid surface comprising, two pairs of closely spaced parallel conducting rods, said pairs of rods being spaced from each other and adapted to be immersed vertically into the liquid an equal distance below a horizontal reference plane, an alternator coupled to each pair of said rods for passing an alternating current therebetween, the resistance between each of said pairs of rods being proportional to the extent to which they are respectively immersed below the surface of the liquid, first and second detectors respectively coupled to said two pairs of rods for producing direct current signals proportional respectively to the alternating current flowing between each of said pairs of rods, means for subtracting one of said detected signals from the other to thereby produce a direct current signal proportional to the liquid slope, and means for continuously recording said direct current signal.

2. Apparatus for measuring the slope of a liquid surface comprising, two pairs of closely adjacent, parallel stainless steel wires spaced from each other, and means for measuring the difference in liquid height between said pairs of wires, said last-mentioned means comprising, an alternator coupled to each pair of said wires for passing an electric current therebetween, the resistance between each of said pairs of wires being proportional to the extent to which they are respectively immersed below the surface of the liquid, first and second detectors respectively coupled to said two pairs of wires for producing direct current signals proportional respectively to the alternating current flowing between each pair, a circuit constructed and arranged to subtract one of said detected signals from the other to thereby produce a signal proportional to the difference in liquid height between said two pairs of wires and consequently proportional to liquid slope, and means for continuously recording the slope thus measured.

3. Apparatus for measuring the slope of a liquid between two spaced points comprising, in combination, first and second pairs of closely adjacent electrodes adapted to be positioned vertically at said points, an alternator coupled to one electrode of each of said pairs, means connected to the other electrode of each of said pairs arranged to produce first and second alternating signals having peak amplitudes proportional to liquid height at said first and second points, means detecting said first and second alternating signals to produce first and second direct current signals respectively proportional to the amplitudes of said first and second alternating signals, means combining said first and second direct current signals to produce a single direct current signal having a polarity dependent upon which of said direct current signals is the larger and a magnitude dependent on the degree of unbalance of said first and second direct current signals, said single signal being indicative of the slope of the liquid between said two points, and means for recording said single signal.

4. Apparatus for measuring the slope between two spaced points of the surface of a conductive liquid comprising, two pairs of spaced electrodes adapted to be immersed vertically into the liquid at said points an equal distance below a horizontal reference plane, means for coupling an alternating current source to each pair of electrodes, the resistance between the electrodes of each pair being proportional to the extent to which they are respectively immersed below the surface of the liquid, means for detecting direct current signals proportional to the alternating currents flowing between each pair of electrodes, and means for subtracting said signals to thereby produce a voltage proportional to liquid slope.

5. Apparatus for indicating the slope of a liquid surface between two spaced points comprising, two pairs of closely spaced parallel conductors adapted to be immersed vertically into the liquid at said points an equal distance below a horizontal reference plane, means for passing an alternating current through each pair of conductors, and means comprising detector means coupled to each pair of said conductors for comparing the difference in resistance to the flow of current between said pairs of conductors as determined by the height of the liquid between each pair of conductors.

6. Apparatus for indicating the slope of a liquid surface between two spaced points comprising, two pairs of closely spaced parallel conductors, said pairs of conductors being adapted to be immersed vertically into the liquid at said points an equal distance below a horizontal reference plane, means for passing an alternating current through each pair of said conductors, the resistance between conductors of each pair being proportional to the extent to which they are respectively immersed below the surface of the liquid, and means for recording the sign and magnitude of the difference in resistance to the flow of current in said two pairs of conductors comprising first and second detector means coupled to each pair of conductors respectively for producing direct current signals proportional respectively to the alternating current flowing between each pair of conductors.

7. Apparatus for indicating the slope of a liquid surface comprising, two pairs of closely spaced parallel conductors, said pairs of conductors being spaced from each other and adapted to be immersed vertically into the liquid so that the bottom of each conductor is an equal distance below a horizontal reference plane, means coupled to each pair of said conductors for passing an alternating current therebetween, the resistance between the conductors of each pair being proportional to the extent to which they are respectively immersed below the surface of the liquid, means for detecting the voltage drop across each pair of said conductors, and means for subtracting one voltage drop from the other to produce a voltage proportional to the liquid slope.

References Cited in the file of this patent

UNITED STATES PATENTS

| | | |
|---|---|---|
| 712,699 | May | Nov. 4, 1902 |
| 2,018,431 | Wolf | Oct. 22, 1935 |
| 2,103,741 | Bencowitz | Dec. 28, 1937 |
| 2,298,983 | Macintyre | Oct. 13, 1942 |
| 2,388,559 | Macintyre | Nov. 6, 1945 |
| 2,439,770 | Brown et al. | Apr. 13, 1948 |